(12) United States Patent
Chen et al.

(10) Patent No.: US 11,499,626 B2
(45) Date of Patent: Nov. 15, 2022

(54) SYSTEM AND METHOD FOR CHANGING TO A LOW GEAR RANGE OF A FOUR WHEEL DRIVE VEHICLE

(71) Applicant: Ford Global Technologies, LLC, Dearborn, MI (US)

(72) Inventors: Weitian Chen, Windsor (CA); Matthew John Shelton, Grosse Ile, MI (US); Pinzhi Liu, Basking Ridge, NJ (US); Jose Velazquez Alcantar, Canton, MI (US); Zhengyu Dai, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 16/708,200

(22) Filed: Dec. 9, 2019

(65) Prior Publication Data

US 2021/0172513 A1 Jun. 10, 2021

(51) Int. Cl.
*F16H 61/02* (2006.01)
*F16H 61/682* (2006.01)
(Continued)

(52) U.S. Cl.
CPC .......... *F16H 61/0204* (2013.01); *B60L 15/20* (2013.01); *F16H 61/0213* (2013.01); *F16H 61/0403* (2013.01); *F16H 61/682* (2013.01); *B60L 2240/423* (2013.01); *F16H 2061/0244* (2013.01); *F16H 2708/22* (2013.01)

(58) Field of Classification Search
CPC ............. F16H 61/0204; F16H 61/0213; F16H 61/0403; F16H 61/682; F16H 2061/0244; F16H 2708/22; B60L 15/20; B60L 2240/423; B60W 10/08; B60W 10/10; B60W 10/11
See application file for complete search history.

(56) References Cited

U.S. PATENT DOCUMENTS

| 5,398,565 A | 3/1995 | Brock |
| 6,101,439 A | 8/2000 | Cutting et al. |

(Continued)

FOREIGN PATENT DOCUMENTS

| EP | 0139473 A2 | 5/1985 |
| EP | 0187117 A2 | 7/1986 |

(Continued)

OTHER PUBLICATIONS

Chen, W. et al., "System and Method for Changing Gear Ranges of a Four Wheel Drive Vehicle," U.S. Appl. No. 16/547,418, filed Aug. 21, 2019, 38 pages.

(Continued)

*Primary Examiner* — Edwin A Young
(74) *Attorney, Agent, or Firm* — Vincent Mastrogiacomo; McCoy Russell LLP

(57) ABSTRACT

Methods and system are described for changing a driveline gear range from a higher gear range to a lower gear range. The driveline may include two electric machines and four clutches in a four wheel drive configuration. The methods and systems permit a driveline to change from a higher gear range to a lower gear range without stopping a vehicle.

20 Claims, 4 Drawing Sheets

(51) Int. Cl.
*F16H 61/04* (2006.01)
*B60L 15/20* (2006.01)

(56) References Cited

U.S. PATENT DOCUMENTS

| | | | |
|---|---|---|---|
| 6,353,399 B1 | 3/2002 | Prakash et al. | |
| 6,845,683 B2 | 1/2005 | Tarui et al. | |
| 7,331,899 B2 | 2/2008 | Ortmann et al. | |
| 2004/0200648 A1* | 10/2004 | Tarasinski | B60L 7/26 |
| | | | 180/65.7 |
| 2013/0261863 A1* | 10/2013 | Noguchi | B60L 1/003 |
| | | | 180/65.265 |
| 2014/0243149 A1* | 8/2014 | Holmes | B60W 20/20 |
| | | | 180/65.265 |
| 2016/0039405 A1* | 2/2016 | Terayama | B60W 20/00 |
| | | | 903/906 |

FOREIGN PATENT DOCUMENTS

| | | |
|---|---|---|
| JP | S6213222 A | 1/1987 |
| KR | 100514893 A | 6/2005 |

OTHER PUBLICATIONS

Basile, J., "Systems and Methods for a Bidirectional Decoupler Foran Integrated Starter/Generator," U.S. Appl. No. 16/586,750, filed Sep. 27, 2019, 59 pages.

\* cited by examiner

SYSTEM AND METHOD FOR CHANGING TO A LOW GEAR RANGE OF A FOUR WHEEL DRIVE VEHICLE

FIELD

The present description relates generally to methods and systems for shifting to low gear ranges of axles of a four wheel drive electric vehicle. The electric vehicle may include electric machines that may provide power to a front axle and a rear axle.

BACKGROUND/SUMMARY

A four wheel drive vehicle may include a high gear range and a low gear range. The high gear range may be useful for operating the vehicle at higher speeds and the low gear range may be useful for operation the vehicle at lower speeds. The low gear range may be most suitable for off-road conditions or when the vehicle is traveling on a surface having a low coefficient of friction. A vehicle operator or driver may wish to change between the high and low gear ranges from time to time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
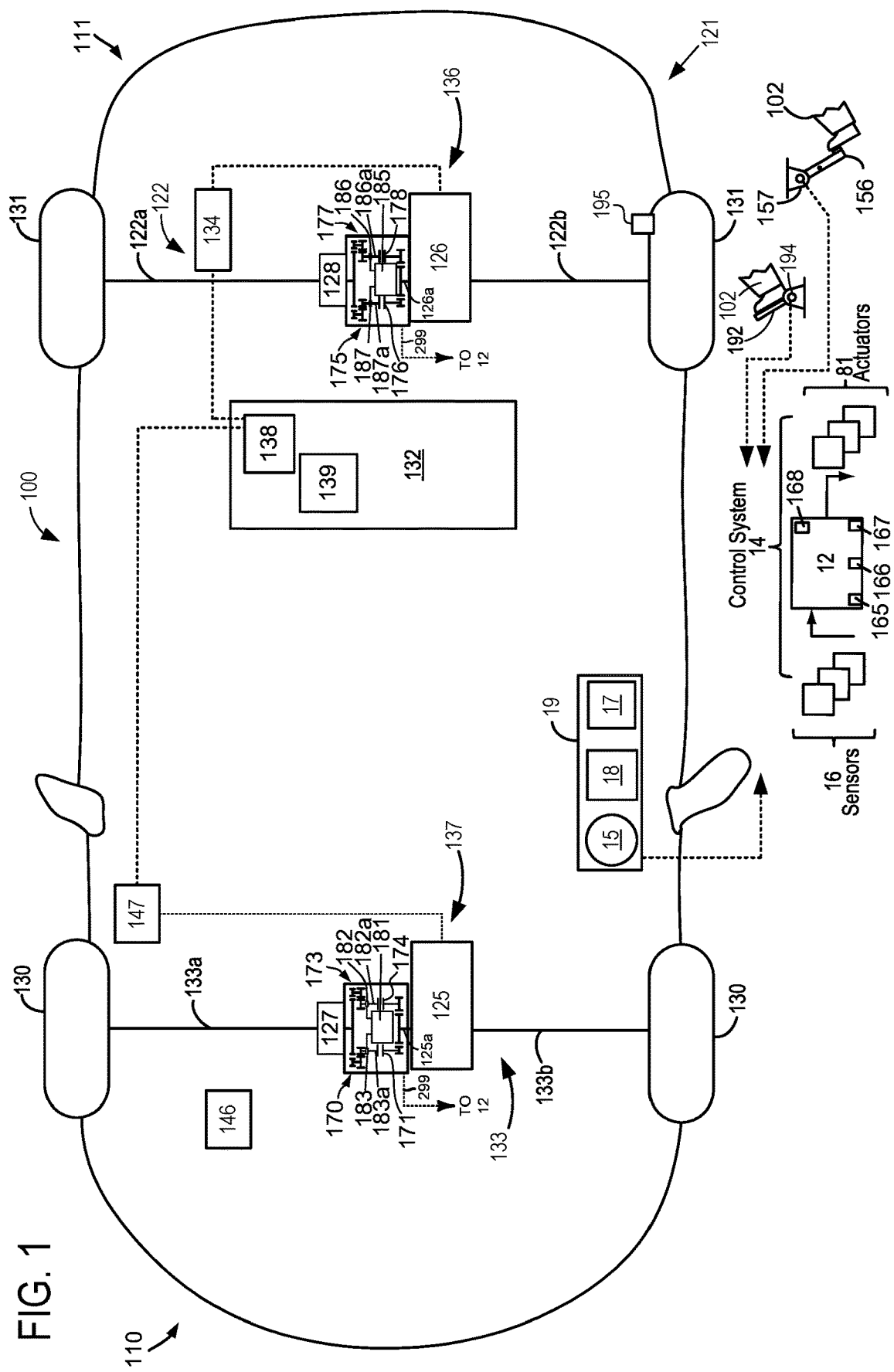
FIG. 1 is a schematic diagram of a vehicle driveline is shown.
Figure 2:
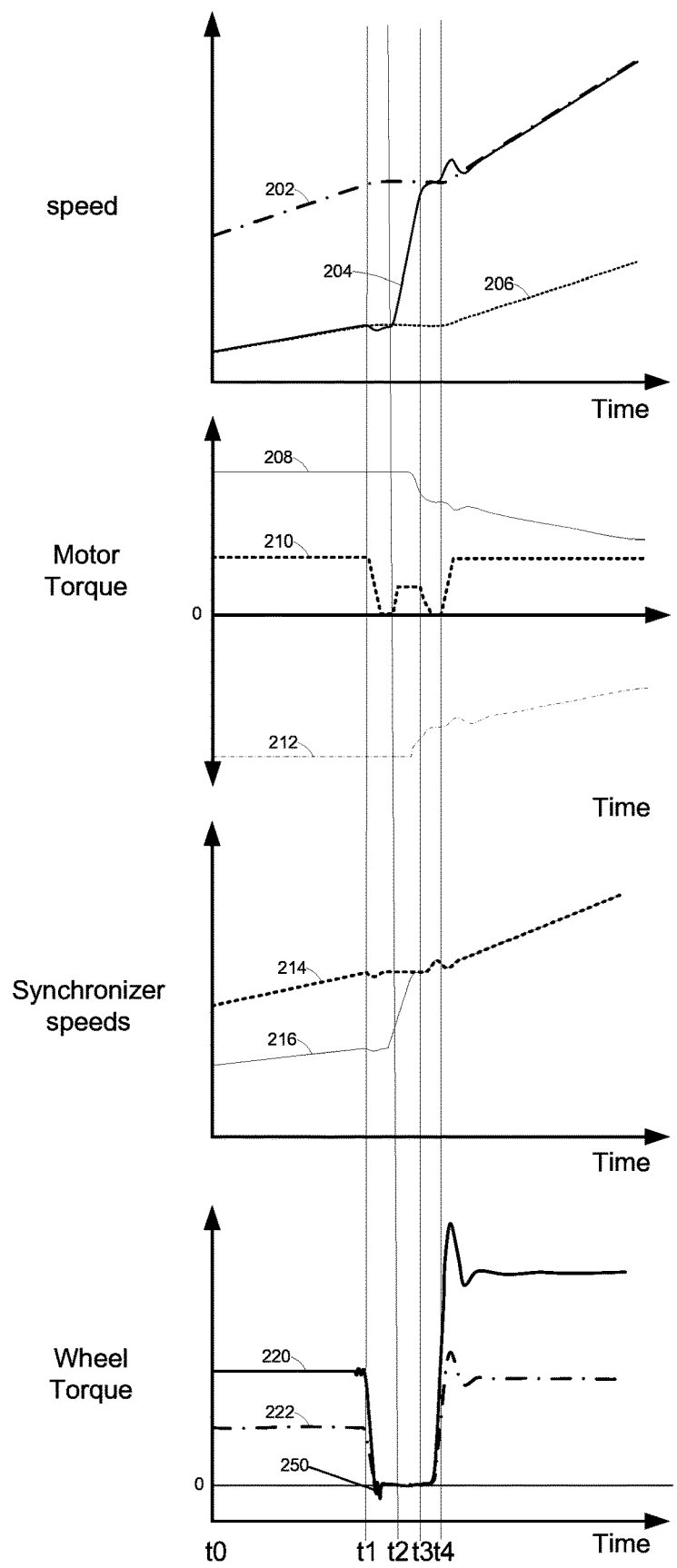
FIGS. 2 and 3 show two different driveline operating sequences.
Figure 3:
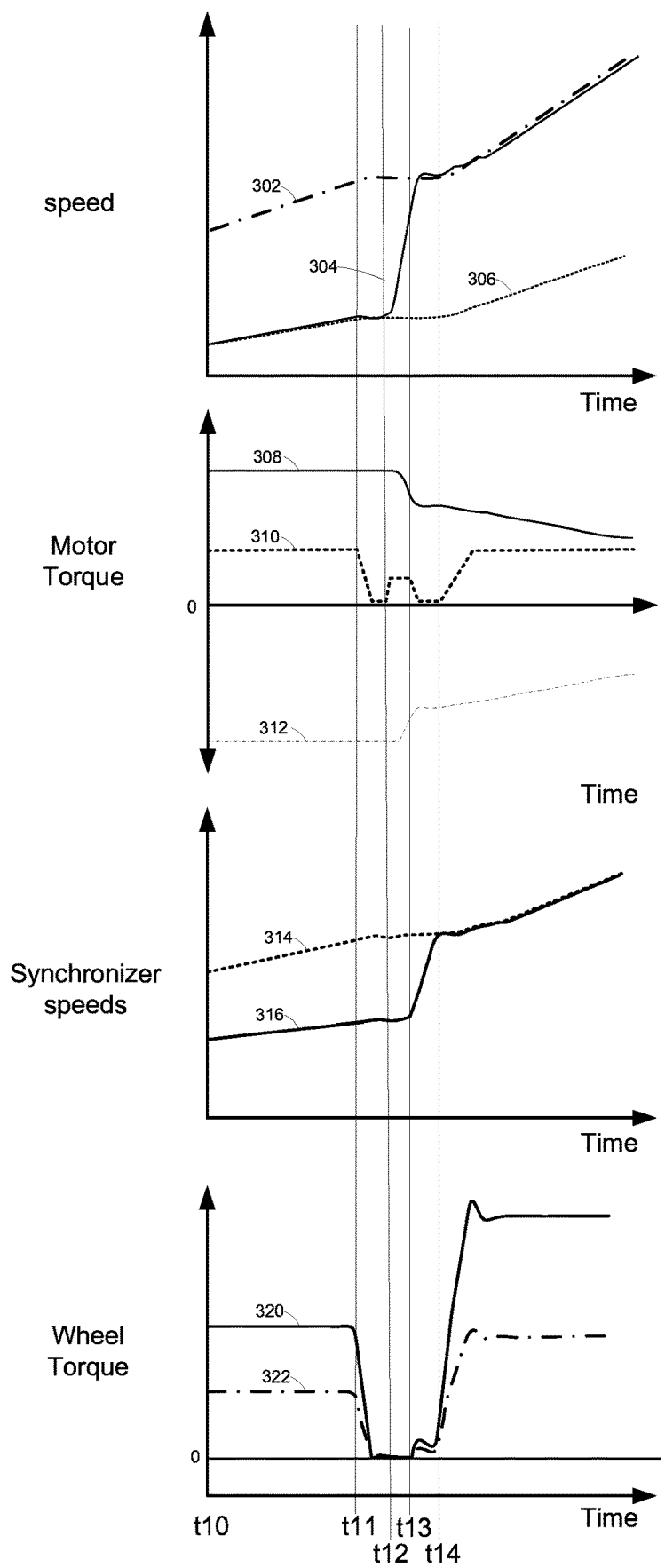
Figure 4:
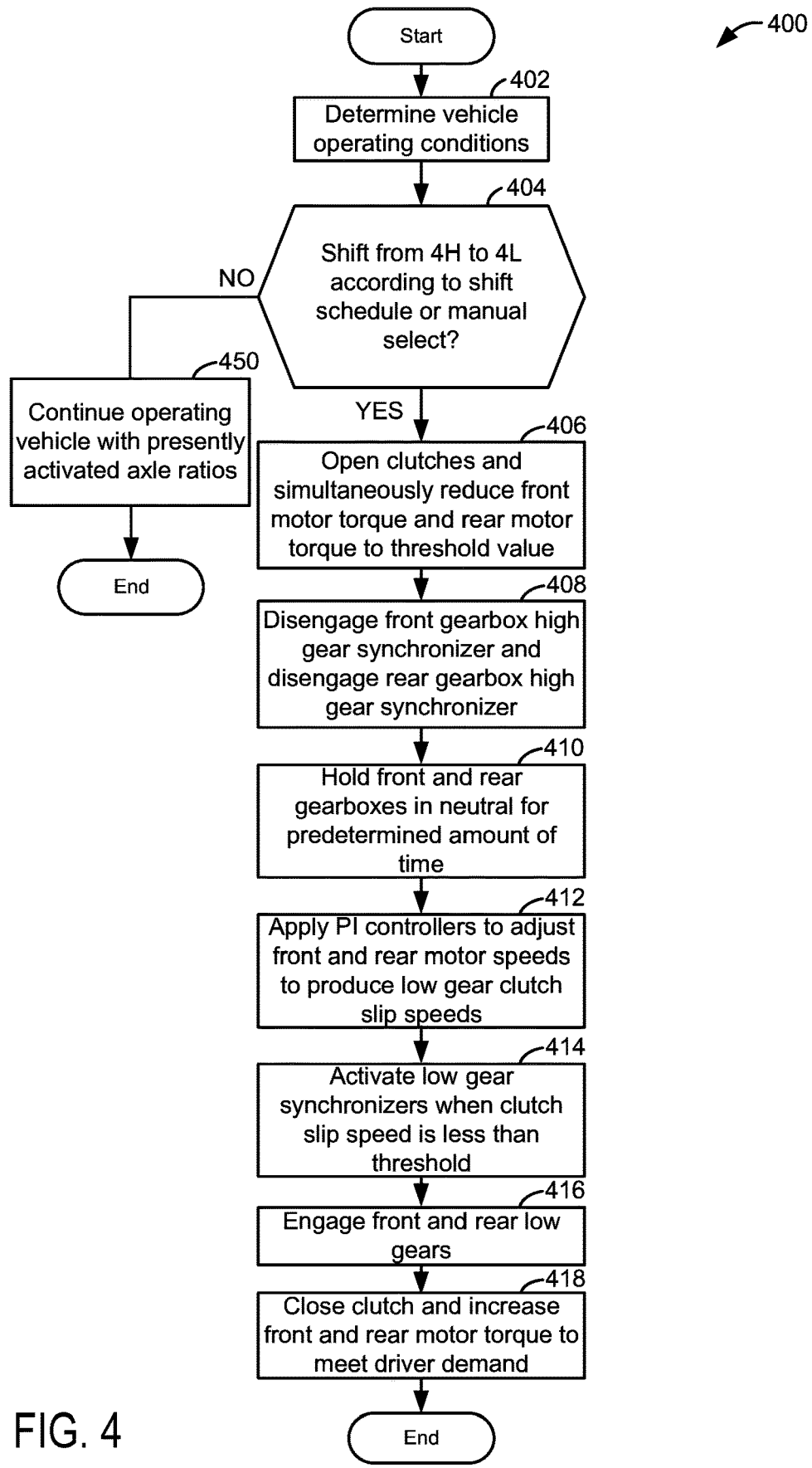
FIG. 4 shows an example of a method for operating a driveline of a four wheel drive vehicle.

The following description relates to systems and methods for operating a driveline or powertrain of a four wheel drive vehicle. The four wheel drive vehicle may be configured as an electric vehicle, or alternatively, the vehicle may be configured as a hybrid vehicle. An example vehicle and driveline or powertrain is shown in FIG. 1. FIGS. 2 and 3 show example driveline operating sequences for shifting axles of an electric machine from a high gear range to a low gear range. A method for operating a four wheel drive vehicle and shifting a driveline from a higher gear range to a lower gear range is shown in FIG. 4. The method of FIG. 4 permits the driveline to be shifted from the higher gear range to the lower gear range while the vehicle is moving and while the vehicle's driver is requesting positive torque via an accelerator pedal or other powertrain input.

A four wheel drive electric vehicle may include two propulsion sources. One propulsion source may selectively supply power to a front axle and the other propulsion source may selectively supply power to a rear axle. Each axle may include a gearbox and the gearbox may include a high range gear and a low range gear. The high range gear may be selectively engaged to operate the vehicle at higher speeds and the low range gear may be selectively engaged to operate the vehicle at lower speeds. In addition, the lower range gear may be selected when it may be desirable to supply larger amounts of wheel torque. For example, the low range gear may be engaged when the vehicle is climbing steeper hills or when the vehicle is traveling through deeper snow or mud.

The gearbox may be shifted into the low range gear from a high range gear via completely stopping the vehicle and manually selecting the low gear range when the vehicle is completely stopped. However, human drivers may find that it is inconvenient to stop the vehicle to shift from a high axle gear range to a low axle gear range. Further, human drivers may find that stopping the vehicle and restarting the vehicle in a different axle gear range to be a time consuming activity that they may not wish to engage in because it may take some additional effort. Nevertheless, if the vehicle is not engaged in the lower range during some conditions, the vehicle may exhibit reduced traction and reduced climbing ability.

The inventors herein have recognized the above-mentioned issues and have developed a method for operating a vehicle, comprising: decreasing output of a first electric machine coupled to a first axle and while decreasing output of a second electric machine coupled to a second axle in response to a request to disengage a higher gears and engage lower gears of the first axle and second axle.

By decreasing output of the first electric machine coupled to the first axle and while decreasing output of the second electric machine coupled to the second axle, it may be possible to change a driveline from a high gear range to a lower gear range without stopping the vehicle. Further, the driveline may switch from the high gear range to the lower gear range when the vehicle's driver is applying an accelerator pedal. Shifting a front axle from a higher gear of the front axle to a lower gear of the front axle while contemporaneously shifting the rear axle from a higher gear of the rear axle to a lower gear of the front axle may reduce an amount of time to shift front and rear axles from high gears to low gears. Further, by adjusting torque output of electric machines while performing the shifting, it may be possible to reduce driveline torque disturbances that may be due to gear lash within the front and rear axles.

The present description may provide several advantages. In particular, the approach allows a driveline to switch from a higher gear range to a lower gear range without having to stop the vehicle. In addition, the approach allows vehicle speed to be maintained during the shifting from the higher gear range to the lower gear range. The approach also controls clutch slip so that the possibility of clutch degradation may be reduced. The approach may also reduce an amount of time it takes to shift gearboxes of front and rear axles from high gear to low gear.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126*a* of rear electric machine 126. Low gear 175 may be engaged via fully closing low gear clutch 176. High gear 177 may be engaged via fully closing high gear clutch 178. High gear clutch 177 and low gear clutch 178 may be opened and closed via commands received by rear drive unit 136 over CAN 299. Alternatively, high gear clutch 177 and low gear clutch 178 may be opened and closed via digital outputs or pulse widths provided via control system 14. In still other examples, a single clutch may be opened and closed to shift from the higher gear 177 to the lower gear 175. Front drive unit is shown with a low gear synchronizer 187 and high gear synchronizer 186. Low gear synchronizer 187 may lock low gear 175 to shaft 187*a*. High gear synchronizer 186 may lock high gear 177 to shaft 186*a*. The synchronizers equalize speed of the lower or high gear with speed of a shaft that is coupled to front electric machine 125 when high gear or low gear is being engaged. Shift forks 185 adjust a position of low gear synchronizer 187 and high gear synchronizer 186 during gear shifting. Rear drive unit 136 may include differential 128 so that torque may be provided to axle 122*a* and to axle 122*b*. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125*a* of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. In still other examples, a single clutch may be opened and closed to shift from the higher gear 173 to the lower gear 170. Front drive unit is shown with a low gear synchronizer 183 and high gear synchronizer 182. Low gear synchronizer 183 may lock low gear 170 to shaft 183*a*. High gear synchronizer 182 may lock high gear 173 to shaft 182*a*. The synchronizers equalize speed of the lower or high gear with speed of a shaft that is coupled to front electric machine 125 when high gear or low gear is being engaged. Shift forks 181 adjust a position of low gear synchronizer 183 and high gear synchronizer 182 during gear shifting. Front drive unit 137 may include differential 127 so that torque may be provided to axle 133*a* and to axle 133*b*. In some examples, an electrically controlled differential clutch (not shown) may be included in rear drive unit 137.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine. A human driver may also request a gear shift via the operator interface.

The system of FIG. 1 provides for a vehicle system, comprising: a first electric machine coupled to a front axle; a second electric machine coupled to a rear axle; a controller including executable instructions stored in non-transitory memory to begin decreasing output of the first electric machine within a threshold amount of time of beginning to decrease output of the second electric machine in response to a request to change a driveline from a higher gear range to a lower gear range. The system includes where the threshold amount of time is less than two seconds. The system includes where the threshold amount of time is less than 0.5 seconds. The system further comprises decreasing the output of the first electric machine to a positive non-zero torque amount, and decreasing the output of the second electric machine to the positive non-zero torque amount. The system further comprises a first gearbox coupled to the front axle and a second gearbox coupled to the rear axle.

In some examples, the system further comprises additional instructions to shift the first gearbox to neutral and the second gearbox to neutral while decreasing output of the first electric machine and output of the second electric machine. The system further comprises additional instructions to engage a synchronizer of a low gear of the first gearbox in response to a slip speed of a first clutch being less than a threshold, and engage a synchronizer of a low gear of the second gearbox in response to a slip speed of the second clutch being less than the threshold. The system further comprises additional instructions to close the first clutch in response to the low gear of the first gearbox being locked to a shaft of the first gearbox and additional instructions to close the second clutch in response to the low gear of the second gearbox being locked to a shaft of the second gearbox.

Referring now to FIG. 2, a prophetic reduced complexity vehicle operating sequence according to the method of FIG. 4 is shown. The vehicle operating sequence shown in FIG. 2 may be provided via the method of FIG. 4 in cooperation with the system shown in FIG. 1. The plots shown in FIG. 2 occur at the same time and are aligned in time. The vertical lines at t0-t4 represent times of interest during the sequence. The sequence of FIG. 2 takes place when an accelerator pedal is applied by a driver such that the wheel torque request is non-zero and while the vehicle is moving on a road.

In this example, the front axle and rear axle are commanded to shift from a higher gear to a lower gear simultaneously. The front axle electric machine and rear axle electric machines are commanded to adjust torque at the same time and in equal amounts throughout the gear shift sequence. The traces shown in FIG. 2 are identical for the front axle and the rear axle.

The first plot from the top of FIG. 2 is a plot of speed versus time. The vertical axis represents speed and the speed increases in the direction of the vertical axis arrow. The horizontal axis represents time and time increases from the left side of the figure to the right side of the figure. Trace 202 represents speeds of the low gears of the front and rear axles. Trace 206 represents speeds of the high gears of the front and rear axles. Trace 204 represents speed of the electric machines of the front and rear axles.

The second plot from the top of FIG. 2 is a plot of torque versus time. The vertical axis represents torque and the magnitude torque increases in the directions of the vertical axis arrows. The horizontal axis represents time and time increases from the left side of the figure to the right side of the figure. Trace 208 represents maximum positive torque for the front and rear electric machines. Trace 210 represents torque of the front and rear axle electric machines. In other words, the single trace 210 represents torque output of the front axle electric machine. Trace 210 also represents torque output of the rear axle electric machine. Trace 212 represents minimum torques of the front and rear axle electric machines.

The third plot from the top of FIG. 2 is a plot of synchronizer speed versus time. The vertical axis represents synchronizer speed for a low gear synchronizer. Synchronizer speed increases in the direction of the vertical axis arrow. Trace 214 represents a speed of a first side (e.g., side nearest the low gear) of the low gear synchronizers for the front axle and the rear axle. Trace 216 represents a speed of an opposite side of the low gear synchronizers for the front and rear axles.

The fourth plot from the top of FIG. 2 is a plot of wheel torque versus time. The vertical axis represents wheel torque and the wheel torque increases in the direction of the vertical axis arrow. The horizontal axis represents time and time increases from the left side of the figure to the right side of the figure. Trace 220 represents the total wheel torque (e.g., wheel torque of the front axle and wheel torque of the rear axle combined). Trace 222 represents individual wheel torques for the front axle and the rear axle.

At time t0, the front electric machine torque and the rear electric machine torque, as indicated by trace 210, are non-zero and they are based on a non-zero or applied accelerator pedal position (not shown). The total wheel torque is at a middle level and the front axle and rear axle high gears are engaged. The synchronizer speeds for the low gear synchronizers are separated and not equal.

At time t1, a request to change the driveline from the higher gear range to a lower gear range occurs (not shown). A gear shift from high gear to low gear in the front axle is started simultaneously with a gear shift from high gear to low gear in the rear axle. The front and rear axle clutches are opened (not shown) and the front and rear axle electric machine torque is reduced at the beginning of the shift (trace 210). The total wheel torque (trace 220) begins to decrease along with the individual wheel torque of the front and rear axles (trace 222). The speeds of both sides of the low gear synchronizer begin to decline as electric machine torque begins to decline.

Between time t1 and time t2, the torque output by the front axle electric machine is reduced to zero as is the torque output from the rear axle electric machine (trace 210 indicates torque of each front and rear axle electric machines). The speed of the low gear declines as does the speed of the high gear. The total wheel torque declines and then it levels off. Likewise, the wheel torque of the front axle and rear axle declines, and then it levels off at zero. However, there is a torque oscillation disturbance in the total wheel torque and in the individual wheel torques as indicated at 250. These torque disturbances may be due to gear lash in the front and rear axle gearboxes. The sequence of FIG. 3 shows how this may be avoided.

At time t2, the electric machine torque of the front axle and electric machine torque of the rear axle is increased while the clutches remain open. The front axle and rear axle electric machine torque are increased so that speed of the electric machines is increased to the speed of the lower gears. A speed of one side of the synchronizer that is coupled to the electric machine begins to increase when speed of the electric machine is increased. A speed of the side of the synchronizer that is coupled to the low gear continues on its previous trajectory. The total wheel torque and wheel torques of the individual axles remains zero since the low gear clutches of the front and rear axles remain open.

At time t3, the speed of the front axle electric machine and the speed of the rear axle electric machine are within a threshold speed of the speed of the low gears of the front axle and rear axle. Therefore, torque output of the front axle electric machine and torque output of the rear axle electric machine are reduced. The synchronizer starts to bring the speed of the electric machine and low gear to a same speed. The total wheel torque and individual wheel torques of the front and rear axles remain zero since the clutches are still open. The clutches of the front gearbox and rear gearbox are commanded fully closed between time t3 and time t4.

At time t4, the front and rear gearbox clutches are fully closed and the front and rear electric machines are commanded to increase torque output to meet the driver demand torque. The total wheel torque oscillates shortly after time t4 when the rate of increase of front wheel torque and rear wheel torque is adjusted to a higher rate. The synchronizer speeds are equal since the low gear is engaged.

Thus, front and rear axles may be shifted simultaneously from high gear to low gear while a vehicle is moving and driver demand torque is non-zero. The shift may include a driveline torque disturbance that may be due to gear lash (e.g., opening and closing of space between gears) during some conditions. Further, the shift may include a torque disturbance when electric machine torque output is increased. Nevertheless, the downshift may be performed quickly so that the shift is performed in a timely manner. Further, the quick shifting may reduce driveline efficiency losses.

Referring now to FIG. 3, a prophetic increased complexity vehicle operating sequence according to the method of FIG. 4 is shown. The vehicle operating sequence shown in FIG. 3 may be provided via the method of FIG. 4 in cooperation with the system shown in FIG. 1. The plots shown in FIG. 3 occur at the same time and are aligned in time. The vertical lines at t10-t14 represent times of interest during the sequence. The sequence of FIG. 3 takes place when an accelerator pedal is applied by a driver such that the wheel torque request is non-zero and while the vehicle is moving on a road.

In this example, the front axle and rear axle are commanded to shift from a higher gear to a lower gear simultaneously. The front axle electric machine and rear axle electric machines are commanded to adjust torque at the same time and in equal amounts throughout the gear shift sequence. The traces shown in FIG. 3 are identical for the front axle and the rear axle.

The first plot from the top of FIG. 3 is a plot of speed versus time. The vertical axis represents speed and the speed increases in the direction of the vertical axis arrow. The horizontal axis represents time and time increases from the left side of the figure to the right side of the figure. Trace 302 represents speeds of the low gears of the front and rear axles. Trace 306 represents speeds of the high gears of the front and rear axles. Trace 304 represents speed of the electric machines of the front and rear axles.

The second plot from the top of FIG. 3 is a plot of torque versus time. The vertical axis represents torque and the magnitude torque increases in the directions of the vertical axis arrows. The horizontal axis represents time and time increases from the left side of the figure to the right side of the figure. Trace 308 represents maximum positive torque for the front and rear electric machines. Trace 310 represents torque of the front and rear axle electric machines. Trace 310 represents torque of the front and rear axle electric machines. In other words, the single trace 310 represents torque output of the front axle electric machine. Trace 310 also represents torque output of the rear axle electric machine. Trace 312 represents minimum torques of the front and rear axle electric machines.

The third plot from the top of FIG. 3 is a plot of synchronizer speed versus time. The vertical axis represents synchronizer speed for a low gear synchronizer. Synchronizer speed increases in the direction of the vertical axis arrow. Trace 314 represents a speed of a first side (e.g., side nearest the low gear) of the low gear synchronizers for the front axle and the rear axle. Trace 316 represents a speed of an opposite side of the low gear synchronizers for the front and rear axles.

The fourth plot from the top of FIG. 3 is a plot of wheel torque versus time. The vertical axis represents wheel torque and the wheel torque increases in the direction of the vertical axis arrow. The horizontal axis represents time and time increases from the left side of the figure to the right side of the figure. Trace 320 represents the total wheel torque (e.g., wheel torque of the front axle and wheel torque of the rear axle combined). Trace 322 represents individual wheel torques for the front axle and the rear axle. In other words, the single trace 322 represents wheel torque of the front axle. Trace 322 also represents wheel torque output of the rear axle.

At time t10, the front electric machine torque and the rear electric machine torque, as indicated by trace 310, are non-zero and they are based on a non-zero or applied accelerator pedal position (not shown). The total wheel torque is at a middle level and the front axle and rear axle high gears are engaged. The synchronizer speeds for the low gear synchronizers are separated and not equal.

At time t11, a request to change the driveline from the higher gear range to a lower gear range occurs (not shown). A gear shift from high gear to low gear in the front axle is started simultaneously with a gear shift from high gear to low gear in the rear axle. The front and rear axle clutches are opened (not shown) and the front and rear axle electric machine torque is reduced at the beginning of the shift (trace 310). However, the rate of front axle electric machine torque reduction and the rate of rear axle electric machine torque reduction are less than those shown in FIG. 2 at time t1. The total wheel torque (trace 320) begins to decrease along with the individual wheel torque of the front and rear axles (trace 322). The speeds of both sides of the low gear synchronizer begin to decline as electric machine torque begins to decline.

Between time t11 and time t12, the torque output by the front axle electric machine is reduced to a non-zero positive value torque (e.g., 10 Newton-meters) as is the torque output from the rear axle electric machine (trace 310 indicates torque of both front and rear axle electric machines). The speed of the low gear declines as does the speed of the high gear. The total wheel torque declines and then it levels off. Likewise, the wheel torque of the front axle and rear axle declines, and then it levels off at zero. Reducing the rate of front axle electric machine torque reduction and rear axle electric machine torque reduction to a slower rate than is shown at time t1 in FIG. 2 and reducing the axle torques to non-zero torques, reduces or eliminates the torque disturbance that occurred at 250 of FIG. 1. Thus, by modifying the torque reduction rate of front and rear axle electric machines, and by ensuring that front and rear axle electric machines torque output is positive and non-zero, driveline torque disturbances that may be related to gear lash may be reduced.

At time t12, the electric machine torque of the front axle and electric machine torque of the rear axle is increased while the clutches remain open. The front axle and rear axle electric machine torque are increased so that speed of the electric machines is increased to the speed of the lower gears. A speed of one side of the synchronizer that is coupled to the electric machine begins to increase when speed of the electric machine is increased. A speed of the side of the synchronizer that is coupled to the low gear continues on its previous trajectory. The total wheel torque and wheel torques of the individual axles remains zero since the low gear clutches of the front and rear axles remain open.

At time t13, the speed of the front axle electric machine and the speed of the rear axle electric machine are within a threshold speed of the speed of the low gears of the front axle and rear axle. Therefore, torque output of the front axle electric machine and torque output of the rear axle electric machine are reduced, but maintained non-zero and positive. The synchronizer starts to bring the speed of the electric machine and low gear to a same speed. The total wheel torque and individual wheel torques of the front and rear axles remain zero since the clutches are still open. The clutches of the front gearbox and rear gearbox are commanded fully closed between time t13 and time t14.

At time t14, the front and rear gearbox clutches are fully closed and the front and rear electric machines are commanded to increase torque output to meet the driver demand torque; however, the rate of torque increase for the front and rear axle at and after time t14 is lower than at time t4 of FIG. 2. The lower rate of torque rise for the front and rear axle electric machines allows the total wheel torque to increase and generate a lower torque oscillation after time t14 as compared to the torque oscillation that is shown after time t4 in FIG. 2. Likewise, torque disturbances in wheel torque of the front axle and wheel torque of the rear axle are shown reduced as compared to shortly after time t4 of FIG. 2. The synchronizer speeds are equal since the low gear is engaged.

Thus, front and rear axles may be shifted simultaneously from high gear to low gear while a vehicle is moving and driver demand torque is non-zero. The shift may include reduced driveline torque disturbances when electric machine torque is not reduced to zero. Further, smoothness of the shift may be improved via adjusting the rate of change in output torque of the front axle electric machine and the rate of change in output torque of the rear axle electric machine.

Referring now to FIG. 4, an example method for operating a vehicle that includes a first electric machine coupled to a front or first axle and a second electric machine coupled to a rear or second axle is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world. All of the actions described herein are commanded simultaneously, or substantially simultaneously (e.g., within 2 seconds of each other), for front and rear axle actuators and devices.

At 402, method 400 determines vehicle operating conditions. Vehicle operating conditions may include but are not limited to vehicle speed, accelerator pedal position, operating states of axle clutches, present wheel torque, and brake pedal position. Method 400 proceeds to 404.

At 404, method 400 judges if there is an operator request to shift the front axle and rear axle gearboxes from high gears to low gears, or alternatively, if there is a request to shift the front axle and rear axle gear boxes from high gears to low gears according to a shift schedule stored in controller memory. In one example, the shift schedule may request a lower gear range or a higher gear range according to vehicle speed and driver demand torque. The driver demand torque may be determined from accelerator pedal position. For example, the shift schedule may request a downshift when driver demand torque is less than 50 Newton-meters and greater than 5 Newton-meters when vehicle speed is less than 30 kilometers/hr. Further, the shift schedule may request an upshift when driver demand torque is greater than 30 Newton-meters and vehicle speed is greater than 30 kilometers/hr. If method 400 judges that there is a request to shift a front axle gearbox from a high gear to a low gear simultaneous with a request to shift a rear axle gearbox from a high gear to a low gear, then the answer is yes and method 400 proceeds to 406.

It should be noted that method 400 may determine that the answer is yes when both the front axle gearbox and the rear axle gearbox are commanded to shift from high gear to low gear at a same time. Further, in some examples, method 400 may determine that the answer is yes when both the front axle gearbox and the rear axle gearbox are command to shift from high gear to low gear within a threshold amount of time (e.g., the front and rear axles are requested to shift from high gear to low gear within 2 seconds of each other).

At 450, method 400 continues to operate the driveline with gears of axles engaged in their present configuration. For example, if method 400 judges that the driveline is operating with high gear ratios of axles engaged, the driveline continues to operate with high gear ratios of the axles engaged. Method 400 proceeds to exit.

At 406, method 400 begins opening clutches of the front axle and the rear axle. If the front axle includes a single clutch and the rear axle includes a single clutch, the front axle clutch is commanded open and the rear axle clutch is commanded open. If the front axle includes two clutches and the rear axle includes two clutches, the front axle high gear clutch is commanded open while the low gear clutch of the front axle remains open. The rear axle high gear clutch is commanded open while the low gear clutch of the rear axle remains open. The front clutch and the rear clutch may be commanded to begin opening simultaneously. Or alternatively, the front and rear clutches may be commanded to begin opening within a threshold amount of time (e.g. within 2 seconds of each other).

Method 400 also reduces torque output of the front axle electric machine and torque output of the rear axle electric machine at a rate that is a function of driver demand torque. The rate of torque decrease may be greater for higher driver demand torques and the rate of torque decrease may be less for lower driver demand torques. For example, the rate of torque decrease for front and rear axle electric machines may be 10 Newton-meters/second when driver demand torque is 100 Newton-meters. The rate of torque decrease for front and rear axle electric machines may be 5 Newton-meters/second when driver demand torque is 50 Newton-meters. This may provide a smooth torque progression while providing quicker shifts at higher driver demand torque values. Method 400 may reduce the electric machine torques of the front axle and rear axle to a non-zero positive torques so that driveline torque disturbances that may be due to gear lash may be avoided. In addition, the electric machine torque may not be adjusted to zero or less than zero during the gear shift to improve shift smoothness. For example, method 400 may reduce front axle electric machine torque to a minimum of 10 Newton-meters and rear axle electric machine torque to a minimum of 10 Newton-meters during a shift from a higher gear (e.g., $2^{nd}$ gear) to a lower gear (e.g., $1^{st}$ gear). The front axle electric machine torque may be reduced at a same rate as the rear axle electric machine torque. Method 400 proceeds to 408.

At 408, method 400 also adjusts shift forks to disengage synchronizers of the front axle gearbox high gear and to disengage synchronizers of the rear axle gearbox high gear. The front and rear axle gearboxes may enter a neutral state (e.g., no synchronizers or gears of the gearboxes engaged) once the high gear synchronizers are disengaged. The front axle shift forks may disengage the front axle high gear at a same time as rear axle forks disengage the rear axle high gear. Method 400 proceeds to 410.

At 410, method 400 holds the front and rear axles in neutral (e.g., no gears or synchronizers are engaged and torque cannot be transferred across the gearbox) for a predetermined amount of time. Holding the gearboxes in neutral may improve shift smoothness and vehicle drivability. In one example the predetermined amount of time may be a function of driver demand torque so that for higher driver demands, the amount of time the gearboxes are in neural may be shortened. Method 400 proceeds to 412.

At 412, method 400 adjusts speeds of the electric machines to speeds of shafts that are coupled to the low gear in the gearboxes. In one example, proportional/integral controllers adjust speeds of electric machines of the front and rear axles to the speeds of shafts that are coupled to the low gears in the front and rear gearboxes. In particular, speeds of the electric machine are adjusted to speeds of low gears. That is, a speed of the front axle electric machine is adjusted to a speed of the front axle low gear. A speed of the rear axle electric machine is adjusted to a speed of the rear axle low gear. Method 400 proceeds to 412.

At 414, method 400 adjusts the low gear synchronizers to engage the low gears of the front and rear axles. The low gear synchronizer position may be adjusted via moving shift forks. The synchronizers may apply a friction force between two moving shafts or devices so as to equalize the speeds of the two shafts or devices. The shift forks begin engaging the low gear synchronizers when a speed of one side of the low gear clutch is within a predetermined speed (e.g., 10 RPM) of a speed of the other side of the low gear clutch. In other words, the shift forks may begin engaging the low gear synchronizers when clutch slip speed (e.g., a speed difference from an input side of a clutch to an output side of the clutch) is less than a threshold speed. The positions of the synchronizers of the front and rear axle may be adjusted simultaneously. Method 400 proceeds to 416.

At 416, method 400 engages the low gear of the front axle and the low gear of the rear axle. The shift forks may complete the engagement of the front and rear low gears via adjusting a position of the synchronizers so that dog teeth of the synchronizers engage and lock the low gears to shafts within the gearboxes. Method 400 proceeds to 418.

At 418, method 400 closes the front and rear axle low gear clutches and increases torque output of the front and rear axle electric machines. In particular, method 400 fully closes the front and rear axle low gear clutches. Further, method 400 increases torque output of the front and rear axle electric machines as a function of driver demand torque. For example, the rate of torque increase for front and rear axle electric machines may be 10 Newton-meters/second when driver demand torque is 100 Newton-meters. The rate of torque increase for front and rear axle electric machines may be 5 Newton-meters/second when driver demand torque is 50 Newton-meters. This may provide a smooth torque progression while providing quicker shifts at higher driver demand torque values. The electric machine torque of the front and rear axles may be adjusted simultaneously and at a same rate to ensure short shifting times. Method 400 proceeds to exit.

In this way, gears of front and rear axles may be shifted simultaneously to reduce shifting time. Further, the same control actions (e.g., opening a clutch, adjusting electric machine torque, etc.) for each axle may be performed simultaneously to reduce shifting time and to maintain shifting consistency. For example, as previously described, torque output of a front axle electric machine may be reduced at a same time as torque output of a rear axle electric machine. Additionally, the rate of torque change for the front axle electric machine may be equal to the rate of torque change for the rear axle electric machine.

Thus, the method of FIG. 4 provides for a method for operating a vehicle, comprising: decreasing output of a first electric machine coupled to a first axle and while decreasing output of a second electric machine coupled to a second axle in response to a request to disengage higher gears and engage lower gears of the first axle and second axle. The method includes where decreasing output of the first electric machine while decreasing output of the second electric machine includes decreasing torque output of the first electric machine and decreasing output torque of the second electric machine. The method further comprises decreasing the output torque of the first electric machine at a same rate as decreasing the output torque of the second electric machine. The method includes where the request to disengage the higher gears and engage the lower gears is based on a shift schedule. The method includes where the shift schedule describes when to disengage the higher gears and engage the lower gears as a function of vehicle speed and driver demand torque. The method includes where a beginning of decreasing output of the first electric machine occurs contemporaneously with beginning of decreasing output of the second electric machine. The method includes where a beginning of decreasing output of the first electric machine occurs within a threshold amount of time of a beginning of decreasing output of the second electric machine.

The method of FIG. 4 also provides for a method for operating a vehicle, comprising: decreasing output of a first electric machine coupled to a first axle to a non-zero positive torque while decreasing output of a second electric machine coupled to a second axle to the non-zero positive torque in response to a request to shift gears of the first axle and the second axle. The method includes where decreasing output of the first electric machine includes decreasing torque output of the first electric machine as a function of driver demand torque. The method includes where decreasing output of the second electric machine includes decreasing torque output of the second electric machine as a function of driver demand torque. The further comprises opening a clutch immediately before or during the decreasing output of the first electric machine. The method further comprises closing a clutch immediately before or during increasing output of the first electric machine in response to the request to shift gears of the first axle and the second axle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
decreasing output of a first electric machine coupled to a first axle and while decreasing output of a second electric machine coupled to a second axle in response to a request to disengage higher gears and engage lower gears of the first axle and second axle.

2. The method of claim 1, where decreasing output of the first electric machine while decreasing output of the second electric machine includes decreasing torque output of the first electric machine and decreasing output torque of the second electric machine.

3. The method of claim 2, further comprising decreasing the output torque of the first electric machine at a same rate as decreasing the output torque of the second electric machine.

4. The method of claim 3, where the request to disengage the higher gears and engage the lower gears is based on a shift schedule.

5. The method of claim 4, where the shift schedule describes when to disengage the higher gears and engage the lower gears as a function of vehicle speed and driver demand torque.

6. The method of claim 1, where a beginning of decreasing output of the first electric machine occurs contemporaneously with beginning of decreasing output of the second electric machine.

7. The method of claim 1, where a beginning of decreasing output of the first electric machine occurs within a threshold amount of time of a beginning of decreasing output of the second electric machine.

8. A vehicle system, comprising:
a first electric machine coupled to a front axle;
a second electric machine coupled to a rear axle;
a controller including executable instructions stored in non-transitory memory to begin decreasing output of the first electric machine within a threshold amount of time of beginning to decrease output of the second electric machine in response to a request to change a driveline from a higher gear range to a lower gear range.

9. The system of claim 8, where the threshold amount of time is less than two seconds.

10. The system of claim 8, where the threshold amount of time is less than 0.5 seconds.

11. The system of claim 8, further comprising decreasing the output of the first electric machine to a positive non-zero torque amount, and decreasing the output of the second electric machine to the positive non-zero torque amount.

12. The system of claim 11, further comprising a first gearbox coupled to the front axle and a second gearbox coupled to the rear axle.

13. The system of claim 12, further comprising additional instructions to shift the first gearbox to neutral and the second gearbox to neutral while decreasing output of the first electric machine and output of the second electric machine.

14. The system of claim 13, further comprising additional instructions to engage a synchronizer of a low gear of the first gearbox in response to a slip speed of a first clutch being less than a threshold, and engage a synchronizer of a low gear of the second gearbox in response to a slip speed of a second clutch being less than the threshold.

15. The system of claim 14, further comprising additional instructions to close the first clutch in response to the low gear of the first gearbox being locked to a shaft of the first gearbox and additional instructions to close the second clutch in response to the low gear of the second gearbox being locked to a shaft of the second gearbox.

16. A method for operating a vehicle, comprising:
decreasing output of a first electric machine coupled to a first axle to a non-zero positive torque while decreasing output of a second electric machine coupled to a second axle to the non-zero positive torque in response to a request to shift gears of the first axle and the second axle.

17. The method of claim 16, where decreasing output of the first electric machine includes decreasing torque output of the first electric machine as a function of driver demand torque.

18. The method of claim 16, where decreasing output of the second electric machine includes decreasing torque output of the second electric machine as a function of driver demand torque.

19. The method of claim 16, further comprising opening a clutch immediately before or during the decreasing output of the first electric machine.

20. The method of claim 16, further comprising closing a clutch immediately before or during increasing output of the first electric machine in response to the request to shift gears of the first axle and the second axle.

* * * * *